Nov. 28, 1961 R. N. DAVIS 3,010,770
ROLLER BEARING
Filed April 14, 1960 3 Sheets-Sheet 2
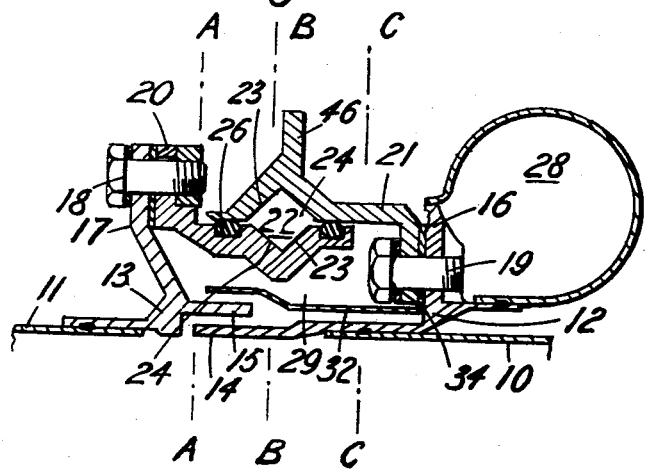
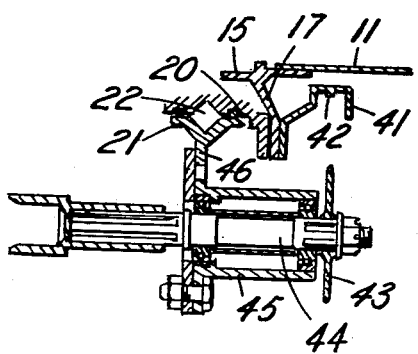

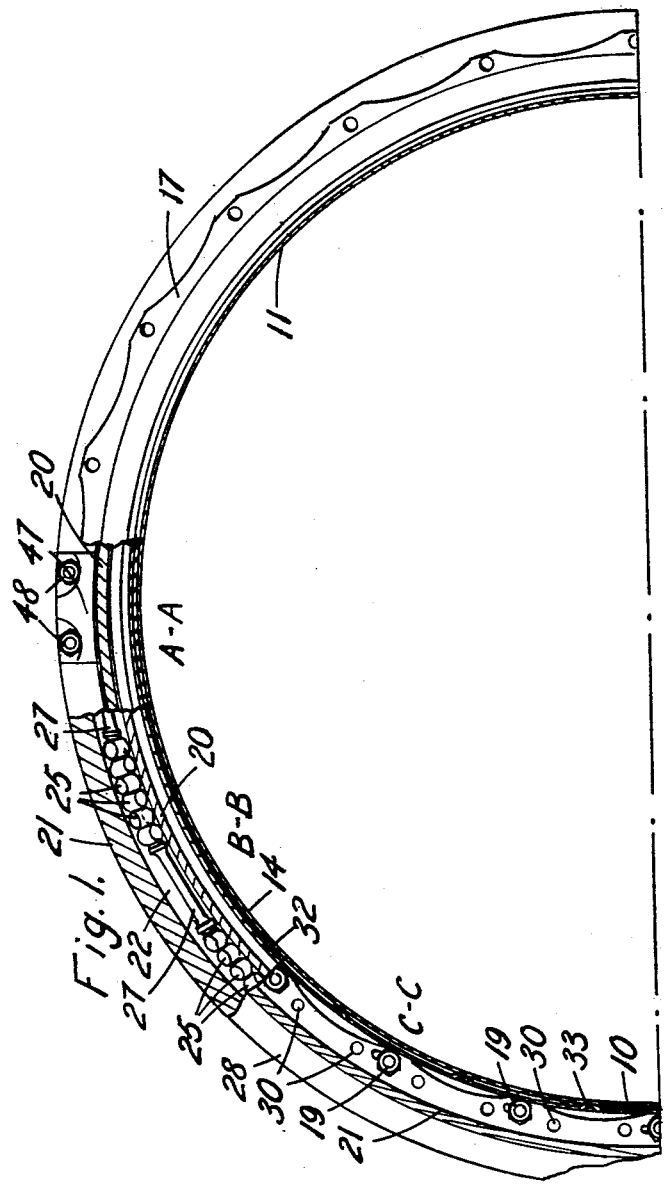

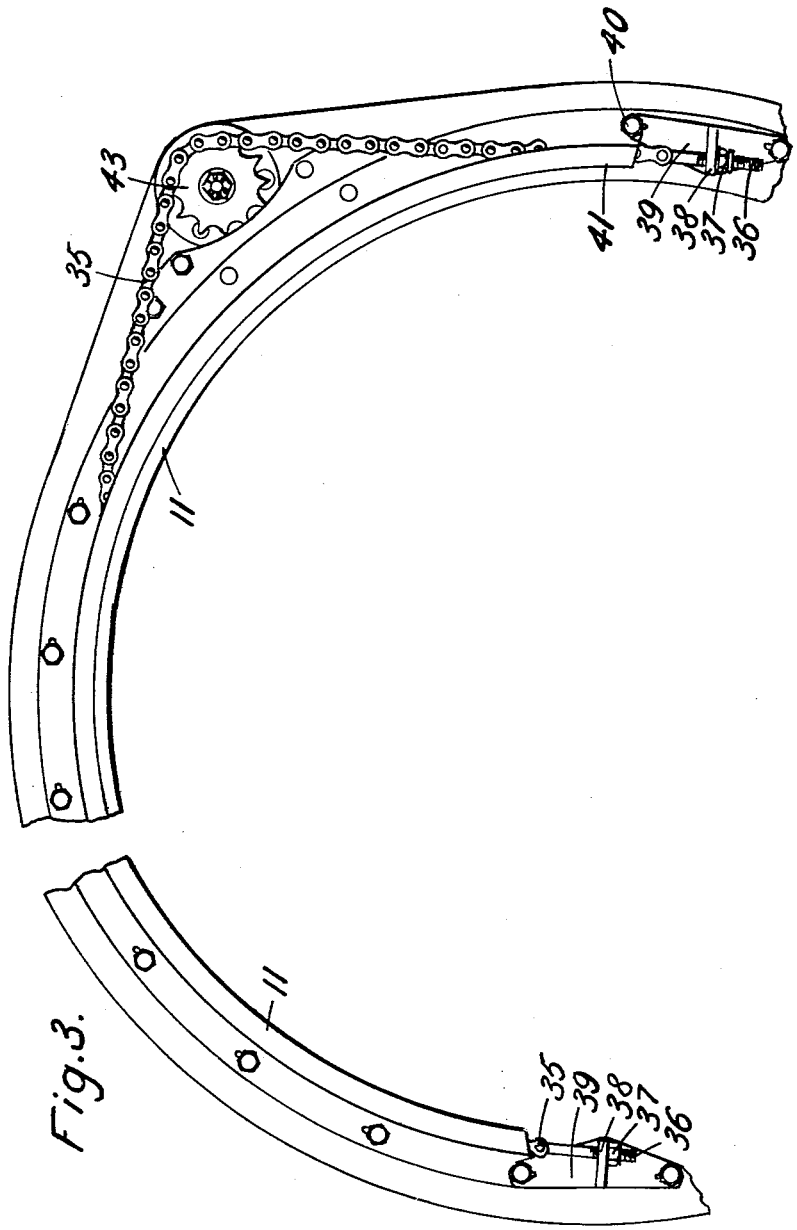

United States Patent Office 3,010,770
Patented Nov. 28, 1961

3,010,770
ROLLER BEARING
Ralph Norman Davis, Bristol, England, assignor to Bristol Siddeley Engines Limited, Bristol, England, a British company
Filed Apr. 14, 1960, Ser. No. 22,172
Claims priority, application Great Britain Apr. 24, 1959
3 Claims. (Cl. 308—77)

This invention relates to a roller bearing and is concerned with the use of such a bearing between a pair of relatively rotatable gas-duct members, which define a gas duct.

According to the invention there is provided the combination of a pair of relatively-rotatable coaxial gas-duct members and a roller bearing, wherein the inner race of the roller bearing surrounds and is radially spaced from the nearer of the gas-duct members, wherein one race of the roller bearing is connected to one of the gas-duct members and the other race of the roller bearing is connected to the other gas-duct member, wherein each race provides two race surfaces at right angles, and wherein a substantial number of the rollers of the bearing roll against one pair of opposed race surfaces and the remainder of the rollers roll against the other pair of opposed race surfaces. Preferably the diagonal between the apices of the race surfaces of both races extends radially of the coaxial duct-members. The combination preferably further comprises means between the inner race and the gas-duct member it surrounds for shielding the races from the gas-duct.

Preferably the races and the means connecting the races to the gas duct members form an annulus surrounding the members and wherein the annulus is adapted to receive coolant gas to cool the races. Preferably the combination further comprises means for supplying coolant gas to the annulus at sufficient pressure to form a pressurising seal between the duct member and the races. The coolant gas is conveniently supplied from an annular manifold mounted adjacent the annulus and connected to supply the coolant gas through apertures in one of the parts forming the annulus.

Preferably the races and the means connecting the races sprocket wheel journalled in a housing fixed relative to one of the gas-duct members and a driving chain fixed at its ends to the other gas-duct member, the said sprocket wheel engaging the driving chain and operable to rotate the gas-duct members relative to one another.

One embodiment of the invention will now be described by way of example with reference to the accompanying drawings.

In the drawings:

FIGURE 1 is a composite figure partly in end elevation and partly in section of one half of a roller bearing between two coaxial tubular gas-duct members, the sections being taken along the planes A—A, B—B and C—C of FIGURE 2;

FIGURE 2 is a cross-section on a larger scale of the roller bearing of FIGURE 1;

FIGURE 3 is an elevation of the two coaxial members together with part of the actuator mechanism for rotating one of the members; and FIGURE 4 is a section of the actuator mechanism shown in FIGURE 3.

Referring in more detail to FIGURES 1 and 2, two coaxial adjacent sections of a pipe for a hot gas stream are represented by the tubular relatively-rotatable gas-duct members 10, 11. The member 10 which is upstream of the member 11 is fixed and the member 11 which represents the upstream straight portion of a pipe bend is rotatable with respect to the fixed member 10. The members 10, 11 carry annular brackets 12, 13 which provide axial flanges 14, 15 overlapping one another and radial flanges 16, 17 which are formed respectively with circumferentially-spaced stud and bolt holes. A flanged plate 20 which is bolted to the radial flange 17 by bolts 18 extends axially upstream and is bent sharply inwards to provide an annular channel of right angle section which faces radially outwards. A second flanged plate 21 which is secured to the radial flange 16 by studs 19 extends axially downstream and is bent sharply outwards to provide an annular channel of right angle section which faces radially inwards and surrounds the channel of the plate 20. The two registering channels co-operate to form an annular channel 22 of substantially square cross-section which lies between the radial flanges 16, 17 and is radially spaced for thermal insulation from the overlapping axial flanges 14, 15 which are exposed to the hot gas stream which passes through the tubular members 10, 11 of the pipe. The four internal surfaces of the square-section channel 22 are suitably hardened to provide two sets of opposite tracks 23, 24 for a single ring of steel cylindrical rollers 25. The bent plate 20 is grooved to receive two sealing rings 26 one on either side of the channel 22.

Because the rotatable member 11 forms part of a pipe bend the bearing is subjected to both axial and radial loads and the directions of the resultant or composite loads will change with the orientation of the gas flow through the rotatable pipe bend. Accordingly the tracks 23, 24 are so inclined that the axes of rotation or the bearing surfaces of all the rollers 25 form acute angles of about 45° with the axis of rotation of the rotatable member 11 i.e. the common axis of the members 10, 11. Half the rollers 25 are inclined at right angles to the other rollers so that half the rollers roll on the inclined tracks 23 whilst the other half of the rollers roll on the inclined tracks 24. As a result of the inclination of the two sets of tracks 23, 24 and of the variation in the orientation of the rollers half the rollers will be well adapted to receive and transmit any composite load through line contact with the appropriate set of tracks. The rollers are suitably lubricated. Spacer elements 27 are provided to reduce the number of rollers and thereby save weight.

The number, type and proportion of rollers which face in any one direction may be varied to suit the operational requirements, and the number, arrangement and type of the spacer elements may also be varied. For example a short spacer may be provided between each pair of adjacent rollers, the rollers may be solid or hollow, and more than half the rollers may be inclined at right angles to the remaining rollers. The rollers are preferably radiused at their edges to reduce the possibility of digging their edges into the tracks.

Because the pipe receives a stream of hot gas it is desirable to cool the roller bearing. An annular manifold 28 is welded to the bracket 12 and is supplied with coolant gas which flows round the manifold and enters the annulus 29 between the channel 22 and the axial flanges 14, 15 of the brackets 12, 13 by passing through a series of circumferentially-spaced passages 30 (see FIGURE 1) formed in the flange 16 and the adjacent radial portion of the plate 21. A deflector plate 32 guides the coolant gas around the radially inner surfaces of the channel-forming plate 20 and then permits it to escape through the annular gap provided between the axial flanges 14, 15 and into the gas stream in the pipe. The pressure of the coolant gas is such that it provides a pressurising seal between the tubular members 10 and 11 and the roller bearing. The deflector plate 32 is equipped with small bosses 33 (see FIGURE 1) by means of which it is supported on the axial flange 14 of the bracket 12 and with tongues 34 which are bent outwardly to engage behind the adjacent end of the plate 21.

Referring now to FIGURES 3 and 4, the rotatable member 11 is arranged to be rotatable through about 100° by means of the following mechanism:

A driving chain 35 terminates at its ends in draw bolts 36 equipped with nuts 37 which abut against apertured flanges 38 on brackets 39, secured by bolts 40 to flange 17. The chain 35 which extends around approximately half the circumference of the member 11 runs in an outwardly facing channel 41 which is bolted to the flange 17, the side plates of the chain being maintained clear of the channel base so as to reduce friction by means of a central rib 42 on which ride the connecting pins of the chain. The chain 35 is driven by a sprocket 43 mounted on the splined end of a driving shaft 44 which may be driven in either direction by any suitable motor (not shown). The driving shaft 44 is supported adjacent the sprocket 43 by two ball bearings within a housing 45 which projects at right angles from a radial flange 46 on the plate 21. When the motor is operated to turn the sprocket 43 in either direction, the chain 35 which is engaged by the sprocket 43 is moved to cause the rotatable member 11 to rotate in the appropriate direction and change the direction of discharge from the pipe bend member 11.

A loading slot is provided for the insertion and removal of the rollers and spacer elements into and from the roller channel 22. For this purpose a loading plate 47 (see FIGURE 1) which constitutes on its internal surface a portion of one of the roller tracks 23 is made removable and in normal operation is secured by means of bolts 48 to the flange 46 of the plate 21. The length of the removable loading plate 47 is sufficient to permit the insertion and removal of the spacer elements 27.

Where the temperature of the gas stream through the pipe so permits, the rollers may be made of phenolic resin.

The invention is particularly but not exclusively applicable to rotatable nozzles e.g. for aircraft in the form of pipe bends which receive streams of compressed air or exhaust gases, the member 11 partly representing such a nozzle which is rotatable so as to discharge the air or gas either downwardly or rearwardly or in an intermediate direction.

I claim:

1. The combination with a pair of relatively rotatable coaxial gas-duct members of a roller bearing between the two members, the roller bearing comprising a radially-outwardly-facing inner race connected to and encircling one of said members in radially-spaced relation thereto, a radially-inwardly-facing outer race connected to and encircling the other of said members in radially-spaced relation thereto, each race providing two race surfaces at right angles to each other, the two race surfaces of one of the races being respectively opposite the two race surfaces of the other of the races, and bearing rollers whereof some roll against one pair of opposed race surfaces and the remainder roll against the other pair of opposed race surfaces, and shield means between the inner race and the gas-duct member which it encircles for shielding the races from the gas-duct members.

2. The combination as claimed in claim 1, wherein an annular space defined in part by the races and their connections to the gas duct members encircles the members, and wherein means is provided for supplying a coolant gas under pressure to said space.

3. The combination with a pair of relatively rotatable coaxial gas-duct members of a roller bearing between the two members, the roller bearing comprising a radially-outwardly-facing inner race connected to and encircling one of said members in radially-spaced relation thereto, a radially-inwardly-facing outer race connected to and encircling the other of said members in radially-spaced relation thereto, each race providing two race surfaces at right angles to each other, the two race surfaces of one of the races being respectively opposite the two race surfaces of the other of the races, and bearing rollers whereof some roll against one pair of opposed race surfaces and the remainder roll against the other pair of opposed race surfaces, shield means between the inner race and the gas-duct member which it encircles for shielding the races from the gas-duct members and of a sprocket wheel journaled on one of the gas-duct members, and a driving chain fixed at its ends to the other gas duct member, the sprocket wheel engaging the driving chain and being rotatable to rotate the gas-duct members relative to one another.

References Cited in the file of this patent

UNITED STATES PATENTS

| | | |
|---|---|---|
| 2,008,378 | Witte | July 16, 1935 |
| 2,423,973 | Halford | July 15, 1947 |
| 2,609,256 | Baker et al. | Sept. 2, 1952 |

FOREIGN PATENTS

| | | |
|---|---|---|
| 973,265 | France | Sept. 13, 1950 |